(12) United States Patent
Kweon et al.

(10) Patent No.: US 6,949,233 B2
(45) Date of Patent: Sep. 27, 2005

(54) METHOD OF PREPARING POSITIVE ACTIVE MATERIAL FOR RECHARGEABLE LITHIUM BATTERIES

(75) Inventors: Ho-Jin Kweon, Cheonan (KR); Jun-Won Suh, Cheonan (KR); Geun-Bae Kim, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 392 days.

(21) Appl. No.: 10/075,473

(22) Filed: Feb. 13, 2002

(65) Prior Publication Data

US 2002/0192148 A1 Dec. 19, 2002

(30) Foreign Application Priority Data

Jun. 5, 2001 (KR) .................................... 2001-0031530

(51) Int. Cl.$^7$ ............................................. C10D 15/00
(52) U.S. Cl. .................... 423/179.5; 423/263; 423/276; 423/277; 423/299; 423/306; 423/518; 423/464; 423/465; 423/594.4; 423/594.6; 429/231.1; 429/231.3; 429/231.95; 429/223; 429/224
(58) Field of Search ........................... 429/231.95, 223, 429/224, 231.3, 231.1; 423/594.6, 179.5, 263, 276, 277, 299, 306, 518, 464, 465, 594.4, 599

(56) References Cited

U.S. PATENT DOCUMENTS 5,567,401 A * 10/1996 Doddapaneni et al. ... 423/179.5
6,210,834 B1 * 4/2001 Kweon et al. ........... 429/231.3

FOREIGN PATENT DOCUMENTS

| JP | 10-125324 | | 5/1998 |
| JP | 2000058059 | * | 2/2000 |
| JP | 2001 6673 | | 1/2001 |

OTHER PUBLICATIONS

Patent Abstract of Japan, Publication No. 2001–006673, published Jan. 12, 2001.

* cited by examiner

Primary Examiner—Steven Bos
(74) Attorney, Agent, or Firm—Christie, Parker and Hale, LLP

(57) ABSTRACT

A method for preparing a positive active material for a rechargeable lithium battery is provided. In this method, a lithium source, a metal source, and a doping liquid including a doping element are mixed and the mixture is heat-treated.

20 Claims, 13 Drawing Sheets

METHOD OF PREPARING POSITIVE ACTIVE MATERIAL FOR RECHARGEABLE LITHIUM BATTERIES

CROSS REFERENCE TO RELATED APPLICATION

This application claims priority of application No. 2001-31530 filed in the Korean Industrial Property Office on Jun. 5, 2001, the disclosure of which is incorporated herein by reference.

FIELD OF THE INVENTION

The present invention relates to a method of preparing a positive active material for a rechargeable lithium battery, and more particularly, to a method of preparing a positive active material for a rechargeable lithium battery having improved such as a high-rate charge and discharge characteristics and a cycle-life characteristics, as well as improved discharge capacity.

BACKGROUND OF THE INVENTION

Rechargeable lithium batteries use a material from or into which lithium ions are deintercalated or intercalated for positive and negative active materials. For an electrolyte, an organic solvent or polymer is used. Rechargeable lithium batteries produce electric energy as a result of changes in the chemical potentials of the active materials during the intercalation and deintercalation reactions of lithium ions.

For the negative active material in a rechargeable lithium battery, metallic lithium was used in the early days of development. Recently, however, carbon-based materials, such as amorphous carbon and crystalline carbon, are extensively used in place of the metallic lithium due to problems of high reactivity toward electrolyte and dendrite formation of the metallic lithium.

For the positive active material in the rechargeable lithium battery, chalcogenide compounds into or from which lithium ions are intercalated or deintercalated are used. Typical examples thereof include, but are not limited to, metal oxide composites such as $LiCoO_2$, $LiMn_2O_4$, $LiNiO_2$, $LiNi_{1-x}Co_xO_2$ ($0<x<1$), and $LiMnO_2$. Manganese-based materials, such as $LiMn_2O_4$ and $LiMnO_2$, are easier to prepare and are less expensive than the other materials and are environmentally friendly, but they disadvantageously have of relatively low capacity. $LiNiO_2$ is inexpensive and has high capacity, but it is difficult to prepare in the desired structure. $LiCoO_2$ is relatively expensive, but widely used as it has good electrical conductivity and high cell voltage.

The positive active material may be prepared by a solid state reaction method. For example, LiOH (or $Li_2CO_3$) is mixed with $Co_3O_4$ at a corresponding equivalent ratio and the mixture is heat-treated at a temperature between 800° C. and 1000° C. to prepare $LiCoO_2$. During the mixing process, another transition metal may be added in solid phase form in order to enhance the charge and discharge characteristics.

Although many advancements have been made for battery technology, demands still exist for further improvements in cycle-life, high rate capability for charge and discharge, and specific capacity characteristics of the active material.

SUMMARY OF THE INVENTION

It is an object of the present invention to provide a method for preparing a positive active material for a rechargeable lithium battery exhibiting improved cycle-life characteristics and high charge and discharge rate capability as well as high specific capacity.

In order to achieve these objects, the present invention provides a method of preparing a positive active material for a rechargeable lithium battery. In this method, a lithium source, a metal source, and a doping liquid are mixed and the mixture is heat-treated. The doping liquid includes a doping element.

For the metal source, a manganese source, a cobalt source, a nickel source, or a mixture thereof may be used. The doping element may include Mg, Al, Co, K, Na, Ca, Si, Ti, Sn, V, Ge, Ga, B, As, Zr, Ni, Mn, Cr, Ge, Sr, V, a rare earth metal, or a mixture thereof, and it preferably includes Al or B. Preferably, the metal source is a cobalt source and the doping liquid is an Al-including doping liquid; or the metal source comprises a manganese source and a nickel source, and the doping liquid is an Al-including doping liquid or a B-including doping liquid.

BRIEF DESCRIPTION OF THE DRAWINGS

A more complete appreciation of the invention, and many of the attendant advantages thereof, will be readily apparent as the same becomes better understood by reference to the following detailed descriptions when considered in conjunction with the accompanying drawings, wherein:

FIG. 7b shows an enlarged photograph of FIG. 7a;

FIG. 8b shows an enlarged photograph of FIG. 8a;

FIG. 9b shows an enlarged photograph of FIG. 9a;

DETAILED DESCRIPTION OF THE INVENTION

Figure 1A:
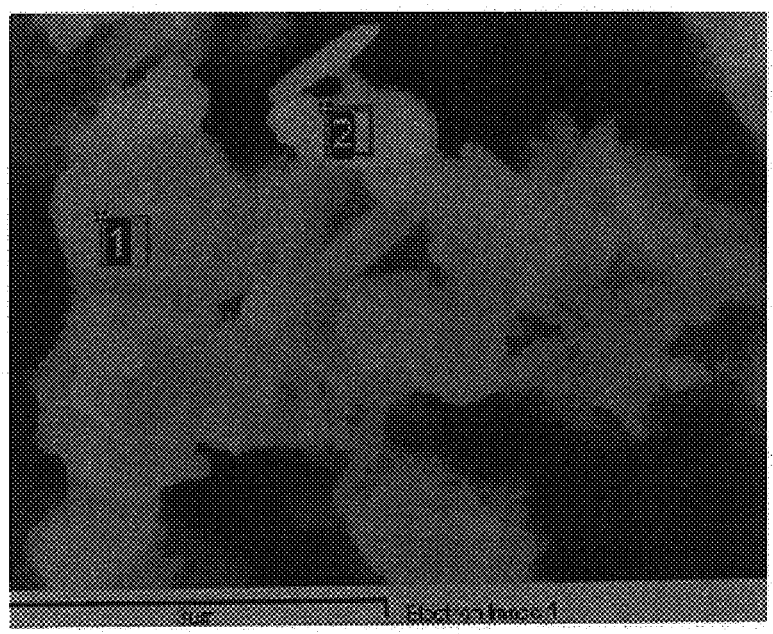
FIGS. 1a and 1b show scanning electron microscope ("SEM", hereinafter) photographs of positive active materials according to Example 3 of the present invention and Comparative Example 1, respectively.

A method for preparing a positive active material of the present invention is characterized in that a doping element is doped in liquid form and is partially substituted for the essential constitutes of cobalt, manganese, or nickel, through doping. That is, in a conventional doping technique, the doping element is added in a solid-state form (e.g., a powdery state), while the doping element of the present invention is doped in liquid form. By using the doping element in liquid form, the present invention enables uniform distribution of the doping element, probably by modification of the surface form of the positive active material, such that the resultant positive active material shows improved high-rate charge and discharge capability (therefore, high power), cycle-life and specific discharge capacity.

According to the present invention, the first step is to mix a lithium source, a metal source, and a doping liquid in an appropriate ratio. The doping liquid includes a doping element.

Examples of the doping element, to impart a stable structure for an active material, include, but are not limited to, Mg, Al, Co, K, Na, Ca, Si, Ti, Sn, V, Ge, Ga, B, As, Zr, Ni, Mn, Cr, Sr, rare earth metals, and mixtures thereof.

The doping liquid is prepared by dissolving a doping source, such as a doping element, a doping element alkoxide, a doping element salt, or a doping element oxide, in a volatile solvent or water. The doping liquid may be in the form of a solution or a suspension.

Examples of the doping element alkoxide include methoxide, ethoxide, and isopropoxide. Typical examples of the doping element salt and the doping element oxide include a vanadate such as ammonium vanadate ($NH_4$($VO_3$)), a nitrate such as $Al(NO_3)_3$, and vanadium oxide ($V_2O_5$).

The volatile solvent may be any conventional solvent that is capable of dissolving the doping source, and that is easily volatilized. Typical examples thereof include ether, methylene carbonate, acetone, and linear and branched $C_1$ to $C_4$ alcohols such as methanol, ethanol, propanol, and isopropyl alcohol. When water is used as a solvent, it is preferable to carry out a subsequent drying process for an extended period of time, for example for 24 hours, in order to remove the excess solvent.

The concentration of the doping liquid is preferably 0.5% to 20%. When the concentration is below 0.5%, the liquid is too dilute so that drying duration is unduly delayed, whereas when the concentration is more than 20%, it is difficult to prepare a suitable doping liquid.

For the main metal source, at least one of a manganese source, cobalt source, or nickel source may be used. Typical examples of suitable manganese sources include manganese acetate, manganese dioxide, and manganese nitrate. Typical examples of suitable cobalt sources include cobalt oxide, cobalt nitrate, and cobalt carbonate. Typical examples of suitable nickel sources include nickel hydroxide, nickel nitrate, and nickel acetate. Fluorine sources, sulfur sources, and/or phosphorous sources may be further precipitated together with the manganese sources, cobalt sources, nickel sources, or nickel-cobalt sources. Suitable fluorine sources include manganese fluoride and lithium fluoride, and suitable sulfur sources may include manganese sulfide and lithium sulfide. An exemplary phosphorous source is $H_3PO_4$. Note that the above lists of manganese, cobalt, nickel, nickel-manganese, fluorine, sulfur, and phosphorous sources are not exhaustive lists.

When a manganese source and a nickel source are used for the metal source, an aqueous solution of a mixture of the manganese source and the nickel source may be prepared. Then any base, such as ammonia, is added to this solution in order to adjust the pH of the solution to obtain manganese-nickel hydroxide (co-precipitation). The resulting manganese-nickel hydroxide may be mixed with a doping liquid.

Preferably, the mixing process is performed until the excess solvent is evaporated to be in a visibly solvent-free state.

Subsequently, the resultant mixture is heat-treated. The heat-treatment process is performed at a temperature ranging from 400 to 500° C. for 5 to 20 hours (first heat-treatment step), and then, at a temperature ranging from 700° C. to 900° C. for 10 to 30 hours (second heat-treatment step). If the first heat-treatment step temperature is below 400° C., the lithium source may insufficiently react with the metal source and doping elements. In the case when the first heat-treatment temperature is higher than 500° C., it is possible to lose a part of lithium. In addition, if the second heat-treatment step temperature is lower than 700° C., it may be difficult to obtain a crystalline material, whereas if the second heat-treatment temperature is higher than 900° C., a part of lithium may be evaporated resulting in the composition of the positive active material becoming undesirable. Alternatively, the heat-treatment process may be performed at a temperature ranging from 400 to 900° C.

The resultant compound from the above method may be used as prepared, for the positive active material, or it may be sieved through a sieve of an appropriate grading.

The positive active material for the lithium rechargeable battery preferably includes at least one lithiated compound represented by the formulas 1 to 13:

$$Li_xMn_{1-y}M_yA_2 \qquad (1)$$

$$Li_xMn_{1-y}M_yO_{2-z}X_z \qquad (2)$$

$$Li_xMn_2O_{4-z}X_z \qquad (3)$$

$$Li_xMn_{2-y}M_yA_4 \qquad (4)$$

$$Li_xCo_{1-y}M_yA_2 \qquad (5)$$

$$Li_xCo_{1-y}M_yO_{2-z}X_z \qquad (6)$$

$$Li_xNi_{1-y}M_yA_2 \qquad (7)$$

$$Li_xNi_{1-y}M_yO_{2-z}X_z \qquad (8)$$

$$Li_xNi_{1-y}Co_yO_{2-z}X_z \qquad (9)$$

$$Li_xNi_{1-y-z}Co_yM_zA_\alpha \qquad (10)$$

$$Li_xNi_{1-y-z}Co_yM_zO_{2-\alpha}X_\alpha \qquad (11)$$

$$Li_xNi_{1-y-z}Mn_yM_zA_\alpha \qquad (12)$$

$$Li_xNi_{1-y-z}Mn_yM_zO_{2-\alpha}X_\alpha \qquad (13)$$

wherein, $0.95 \leq x \leq 1.1$, $0 \leq y \leq 0.5$, $0 \leq z \leq 0.5$, $0 < \alpha \leq 2$;

M is selected from the group consisting of Mg, Al, Co, K, Na, Ca, Si, Ti, Sn, V, Ge, Ga, B, As, Zr, Ni, Mn, Cr, Ge, Sr, V and rare earth elements;

A is selected from the group consisting of O, F, S and P; and

X is selected from the group consisting of F, S and P.

The following examples further illustrate the present invention, but the invention is not limited by these examples.

COMPARATIVE EXAMPLE 1

$Mn(NO_3)_2$ and $Ni(NO_3)_2$ were dissolved in water to obtain a solution containing Mn and Ni. $NH_4OH$ was added to adjust the pH of this solution at above 9 to obtain $Mn_{0.75}Ni_{0.25}(OH)_2$ by co-precipitation of Ni and Mn.

$Mn_{0.75}Ni_{0.25}(OH)_2$ and LiOH were weighed in the equivalent ratio of Li/(Mn+Ni)=1/1 followed by addition of a small amount of ethanol and then mixing it thoroughly by grinding in a mortar for 30 minutes.

The resultant mixture was first heat-treated in air at 450° C. for 10 hours, then cooled at room temperature and ground in the mortar, followed by carrying out the second heat-treatment in air at 825° C. for 15 hours. The resultant material was sieved through a 325-mesh sieve to obtain a $LiMn_{1.5}Ni_{0.5}O_4$ positive active material powder.

The $LiMn_{1.5}Ni_{0.5}O_4$ positive active material powder, a carbon conductive agent, and a polyvinylidene fluoride binder were weighed in the weight ratio of 94:3:3 followed by mixing in N-methyl pyrrolidone solvent to prepare a positive active material slurry. The slurry was cast (coated) in a coating thickness of 100 $\mu M$ on a 25 $\mu m$ thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution in ethylene carbonate and dimethyl carbonate in a 1:1 volume ratio was used.

COMPARATIVE EXAMPLE 2

A coin-type half-cell was fabricated by the same procedure as in Comparative Example 1, except that the second heat-treatment was performed at 850° C. for 10 hours.

COMPARATIVE EXAMPLE 3

A coin-type half-cell was fabricated by the same procedure as in Comparative Example 1, except that the second heat-treatment was performed at 750° C. for 20 hours.

COMPARATIVE EXAMPLE 4

$Mn(NO_3)_2$ and $Ni(NO_3)_2$ were dissolved in water to obtain a solution containing Mn and Ni. $NH_4OH$ was added to adjust the pH of this solution to above 9 to obtain $Mn_{0.8}Ni_{0.2}(OH)_2$ by co-precipitation of Ni and Mn.

$Mn_{0.8}Ni_{0.2}(OH)_2$ and LiOH were weighed in the equivalent ratio of Li/(Mn+Ni)=1/1 followed by addition of a small amount of ethanol and then thoroughly mixing by grinding in a mortar for 30 minutes.

The resultant mixture was first heat-treated in air at 450° C. for 10 hours, then cooled at room temperature and ground in the mortar. The second heat-treatment was then carried out in air at 750° C. for 20 hours. The resultant material was sieved through a 325-mesh sieve to obtain a $LiMn_{1.6}Ni_{0.4}O_4$ positive active material powder.

The $LiMn_{1.6}Ni_{0.4}O_4$ positive active material powder, a carbon conductive agent, and a polyvinylidene fluoride binder were weighed in the weight ratio of 94:3:3 and mixed in an N-methyl pyrrolidone solvent to prepare a positive active material slurry. The slurry was cast (coated) in a coating thickness of 100 $\mu m$ on a 25 $\mu m$ thick Al foil, and the cast foil was cut into a disk having a 1.6 cm diameter to prepare a positive electrode for a coin cell.

A coin-type half-cell was fabricated in a glove box using the positive electrode and a lithium counter electrode. As the electrolyte, 1 M $LiPF_6$ solution of ethylene carbonate and dimethyl carbonate in a 1:1 volume ratio was used.

COMPARATIVE EXAMPLE 5

$Mn(NO_3)_2$ and $Ni(NO_3)_2$ were dissolved in water to obtain a solution containing Mn and Ni. $NH_4OH$ was added to adjust the pH of this solution to above 9 to obtain $Mn_{0.7}Ni_{0.3}(OH)_2$ by co-precipitaion of Ni and Mn.

$Mn_{0.7}Ni_{0.3}(OH)_2$ and LiOH were weighed in the equivalent ratio of Li/(Mn+Ni)=1/1 followed by addition of a small amount of ethanol and thorough mixing by grinding in a mortar for 30 minutes.

The resultant mixture was first heat-treated in air at 450° C. for 10 hours, then cooled at room temperature and ground in the mortar. The second heat-treatment was then carried out in air at 750° C. for 20 hours. The resultant material was sieved through a 325-mesh sieve to obtain a $LiMn_{1.4}Ni_{0.6}O_4$ positive active material powder. The $LiMn_{1.4}Ni_{0.6}O_4$ positive active material powder, a carbon conductive agent, and a polyvinylidene fluoride binder were weighed in the weight ratio of 94:3:3 followed by mixing in an N-methyl pyrrolidone solvent to prepare a positive active material slurry. The slurry was cast (coated) in a coating thickness of 100 $\mu m$ on a 25 $\mu m$ thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

COMPARATIVE EXAMPLE 6

$Mn(NO_3)_2$ and $Ni(NO_3)_2$ were dissolved in water to obtain a solution containing Mn and Ni. $NH_4OH$ was added to adjust the pH of this solution to above 9 to obtain $Mn_{0.75}Ni_{0.25}(OH)_2$ by co-precipitation of Ni and Mn.

$Mn_{0.75}Ni_{0.25}(OH)_2$, LiOH, and $Al_2O_3$ powder were weighed in the equivalent ratio of Li/(Mn+Ni)/Al=1/1/0.03 followed by addition of a small amount of ethanol and then thorough mixing by grinding in a mortar for 30 minutes.

The resultant mixture was first heat-treated at 450° C. for 10 hours, then cooled at room temperature and ground in the mortar, followed by carrying out the second heat-treatment at 750° C. for 15 hours. The resultant material was sieved using a −325 mesh-sieve to collect a $LiMn_{1.5}Ni_{0.5}Al_{0.03}O_4$ positive active material powder.

The $LiMn_{1.5}Ni_{0.5}Al_{0.03}O_4$ positive active material powder, a carbon conductive agent, and polyvinylidene fluoride binder were weighed in the weight ratio of 94:3:3 and then mixed in an N-methyl pyrrolidone solvent to prepare a positive active material slurry. The slurry was cast (coated) in a coating thickness of 100 $\mu m$ on a 25 $\mu m$ thick Al foil, and then the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

COMPARATIVE EXAMPLE 7

A coin half-cell was fabricated by the same procedure as in Comparative Example 6, except that $Mn_{0.75}Ni_{0.25}(OH)_2$, LiOH, and Al$_2$O$_3$ powder were weighed in an equivalent ratio of Li/(Mn+Ni)/Al=1/1/0.07.

EXAMPLE 1

Mn(NO$_3$)$_2$ and Ni(NO$_3$)$_2$ were dissolved in water to obtain a solution containing Mn and Ni. NH$_4$OH was added to adjust the pH of this solution to above 9 to obtain Mn$_{0.75}$Ni$_{0.25}$(OH)$_2$ by co-precipitation of Ni and Mn.

1 g of Al-isopropoxide powder was dissolved in 19 g of ethanol to prepare an ethanol suspension of 5% Al-isopropoxide.

Mn$_{0.75}$Ni$_{0.25}$(OH)$_2$, LiOH, and the ethanol suspension of 5% Al-isopropoxide were weighed in an equivalent ratio of Li/(Mn+Ni)/Al=1/1/0.01, and mixed in an agate mortar until the excess ethanol was evaporated.

The resultant mixture was first heat-treated at 500° C. for 10 hours under flowing air. The first-heat-treated powder was cooled at room temperature and ground in an agate mortar to prepare a uniform mixture. Subsequently, the powder was subjected to the second heat-treatment at 825° C. for 15 hours under flowing air. The resultant material was sieved through a 325-mesh sieve to obtain a LiMn$_{1.5}$Ni$_{0.5}$Al$_{0.01}$O$_4$ positive active material powder.

The LiMn$_{1.5}$Ni$_{0.5}$Al$_{0.01}$O$_4$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and then the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M LiPF$_6$ solution of ethylene carbonate and dimethyl carbonate in a 1:1 volume ratio was used.

EXAMPLE 2

Mn(NO$_3$)$_2$ and Ni(NO$_3$)$_2$ were dissolved in water to obtain a solution containing Mn and Ni. NH$_4$OH was added to adjust the pH of this solution at above 9 to obtain Mn$_{0.75}$Ni$_{0.25}$(OH)$_2$ by co-precipitation of Ni and Mn.

1 g of Al-isopropoxide powder was dissolved in 19 g of ethanol to prepare an ethanol suspension of 5% Al-isopropoxide.

Mn$_{0.75}$Ni$_{0.25}$(OH)$_2$, LiOH, and the ethanol suspension of 5% Al-isopropoxide were weighed in an equivalent ratio of Li/(Mn+Ni)/Al=1/1/0.03, and mixed in an agate mortar until the excess ethanol was evaporated.

The resultant mixture was first heat-treated at 500° C. for 10 hours under flowing air. The first-heat-treated powder was cooled at room temperature and ground in an agate mortar to prepare a uniform mixture. Subsequently, the powder was subjected to the second heat-treatment at 850° C. for 15 hours under flowing air. The resultant material was sieved through a 325-mesh sieve to obtain a LiMn$_{1.5}$Ni$_{0.5}$Al$_{0.03}$O$_4$ positive active material powder.

The LiMn$_{1.5}$Ni$_{0.5}$Al$_{0.03}$O$_4$ positive active material powder, a carbon conductive agent, and polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M LiPF$_6$ solution of ethylene carbonate and dimethyl carbonate in a 1:1 volume ratio was used.

EXAMPLE 3

Mn(NO$_3$)$_2$ and Ni(NO$_3$)$_2$ were dissolved in water to obtain a solution containing Mn and Ni. NH$_4$OH was added to adjust the pH of this solution at above 9 to obtain Mn$_{0.75}$Ni$_{0.25}$(OH)$_2$ by co-precipitation of Ni and Mn.

1 g of Al-isopropoxide powder was dissolved in 19 g of ethanol to prepare an ethanol suspension of 5% Al-isopropoxide.

Mn$_{0.75}$Ni$_{0.25}$(OH)$_2$, LiOH, and the ethanol suspension of 5% Al-isopropoxide were weighed in the equivalent ratio of Li/(Mn+Ni)/Al=1/1/0.05, and mixed in an agate mortar until the excess ethanol was evaporated. The resultant mixture was first heat-treated at 500° C. for 10 hours under flowing air. The first-heat-treated powder was cooled at room temperature and ground in an agate mortar to prepare a uniform mixture. Subsequently, the powder was subjected to the second heat-treatment at 825° C. for 15 hours under flowing air. The resultant material was sieved through a 325-mesh sieve to obtain a LiMn$_{1.5}$Ni$_{0.5}$Al$_{0.05}$O$_4$ positive active material powder.

The LiMn$_{1.5}$Ni$_{0.5}$Al$_{0.05}$O$_4$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M LiPF$_6$ solution of ethylene carbonate and dimethyl carbonate in a 1:1 volume ratio was used.

EXAMPLE 4

A coin-type half-cell was fabricated by the same procedure as in Example 1, except that Mn$_{0.75}$Ni$_{0.25}$(OH)$_2$, LiOH, and an ethanol suspension of 5% Al-isopropoxide were weighed in an equivalent ratio of Li/(Mn+Ni)/Al=1/1/0.07 to prepare LiMn$_{1.5}$Ni$_{0.5}$Al$_{0.07}$O$_4$.

EXAMPLE 5

A coin-type half-cell was fabricated by the same procedure as in Example 1, except that Mn$_{0.75}$Ni$_{0.25}$(OH)$_2$, LiOH, and an ethanol suspension of 5% Al-isopropoxide were weighed in an equivalent ratio of Li/(Mn+Ni)/Al=1/1/0.07 to prepare LiMn$_{1.5}$Ni$_{0.5}$Al$_{0.07}$O$_4$.

EXAMPLE 6

Mn(NO$_3$)$_2$ and Ni(NO$_3$)$_2$ were dissolved in water to obtain a solution containing Mn and Ni. NH$_4$OH was added to adjust the pH of this solution to above 9 to obtain Mn$_{0.7}$Ni$_{0.3}$(OH)$_2$ by co-precipitation of Ni and Mn.

1 g of Al-isopropoxide powder was dissolved in 19 g of ethanol to prepare an ethanol suspension of 5% Al-isopropoxide.

Mn$_{0.7}$Ni$_{0.3}$(OH)$_2$, LiOH, and the ethanol suspension of 5% Al-isopropoxide were weighed in an equivalent ratio of Li/(Mn+Ni)/Al=1/1/0.01 and mixed in an agate mortar until the excess ethanol was evaporated.

The resultant mixture was first heat-treated at 500° C. for 10 hours under flowing air. The first-heat-treated powder was cooled at room temperature and ground in the agate mortar to prepare a uniform mixture. Subsequently, the powder was subjected to the second heat-treatment at 800° C. for 20 hours under flowing air. The resultant material was sieved through a 325-mesh sieve to obtain a $LiMn_{1.4}Ni_{0.5}Al_{0.01}O_4$ positive active material powder.

The $LiMn_{1.4}Ni_{0.6}Al_{0.01}O_4$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 µm on a 25 µm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

EXAMPLE 7

$Mn(No_3)_2$ and $Ni(NO_3)_2$ were dissolved in water to obtain a solution containing Mn and Ni. $NH_4OH$ was add ed to adjust the pH of this solution to above 9 to obtain $Mn_{0.8}Ni_{0.2}(OH)_2$ by co-precipitation of Ni and Mn.

1 g of Al-isopropoxide powder was dissolved in 19 g of ethanol to prepare an ethanol suspension of 5% Al-isopropoxide.

$Mn_{0.8}Ni_{0.2}(OH)_2$, LiOH, and the ethanol suspension of 5% Al-isopropoxide were weighed in an equivalent ratio of Li/(Mn+Ni)/Al=1/1/0.05, and mixed in an agate mortar until the excess ethanol was evaporated.

The resultant mixture was first heat-treated at 500° C. for 10 hours under flowing air. The first-heat-treated powder was cooled at room temperature and ground in the agate mortar to prepare a uniform mixture. Subsequently, the powder was subjected to the second heat-treatment at 825° C. for 20 hours under flowing air. The resultant material was sieved through a 325-mesh sieve to obtain a $LiMn_{1.6}Ni_{0.4}Al_{0.05}O_4$ positive active material powder.

The $LiMn_{1.6}Ni_{0.4}Al_{0.05}O_4$ positive active material powder, a carbon conductive agent, and a polyvinylidene fluoride binder were weighed in the weight ratio of 94:3:3 and mix ed in an N-methyl pyrrolidone solvent to prepare a positive active material slurry. The slurry was cast (coated) in a coating thickness of 100 µm on a 25 µm thick Al foil, and the cast foil was cut into a disk having a 1.6 m diameter to provide a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

EXAMPLE 8

$Mn(NO_3)_2$ and $Ni(NO_3)_2$ w ere dissolved in water to obtain a solution containing Mn and Ni. $NH_4OH$ was added to adjust the pH of this solution to above 9 to obtain $Mn_{0.74}Ni_{0.25}(OH)_2$ by co-precipitation of Ni and Mn.

1 g of Al-isopropoxide powder was dissolved in 19 g of ethanol to prepare an ethanol suspension of 5% Al-isopropoxide.

$Mn_{0.74}Ni_{0.2}(OH)_2$, LiOH, and the ethanol suspension of 5% Al-isopropoxide were weighed in an equivalent ratio of Li/(Mn+Ni)/Al=1/0.99/0.02, and mixed in an agate mortar until the excess ethanol was evaporated.

The resultant mixture was first heat-treated at 500° C. for 10 hours under flowing air. The first-heat-treated powder was cooled at room temperature and ground in the agate mortar to prepare a uniform mixture. Subsequently, the powder was subjected to the second heat-treatment at 800° C. for 15 hours under flowing air. The resultant material was sieved through a 325-mesh sieve to obtain a $LiMn_{1.48}Ni_{0.5}Al_{0.02}O_4$ positive active material powder.

The $LiMn_{1.48}Ni_{0.5}Al_{0.02}O_4$ positive active material powder, a carbon conductive agent, and a polyvinylidene fluoride binder were weighed in the weight ratio of 94:3:3 and mixed in an N-methyl pyrrolidone solvent to prepare a positive active material slurry. The slurry was cast (coated) in a coating thickness of 100 µm on a 25 µm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

<Morphology Characteristics of Manganese Based Positive Active Material>

Figure 1B:
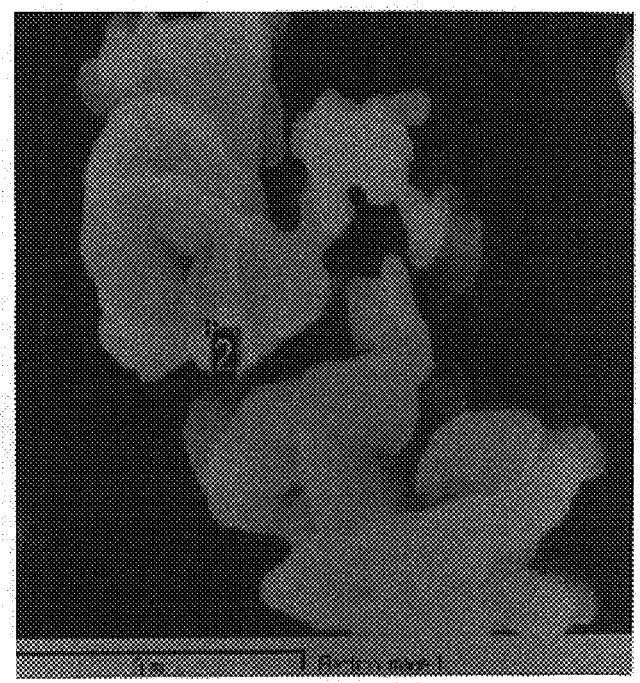

FIGS. 1a and 1b show SEM photographs of positive active materials according to Example 3 and Comparative Example 1, respectively. As shown in FIGS. 1a and 1b, the positive active material of Example 3 is formed by aggregating small particulates, which differs from that of Comparative Example 1.

Figure 2A:
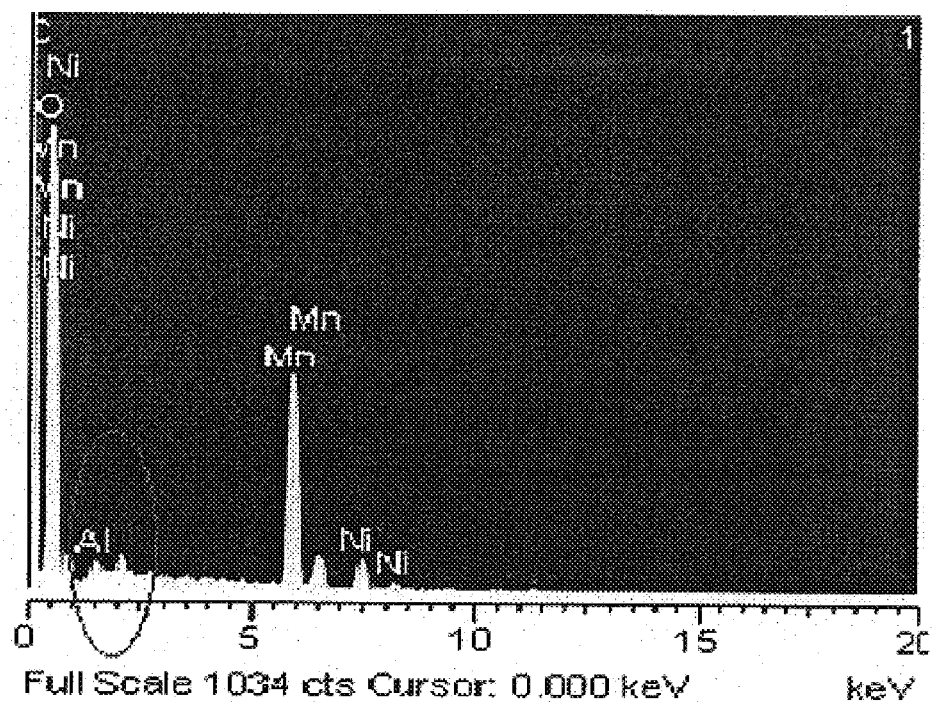
FIGS. 2a and 2b show energy dispersive X-ray ("EDX", hereinafter) analysis of a positive active material according to Example 3 of the present invention.
Figure 2B:
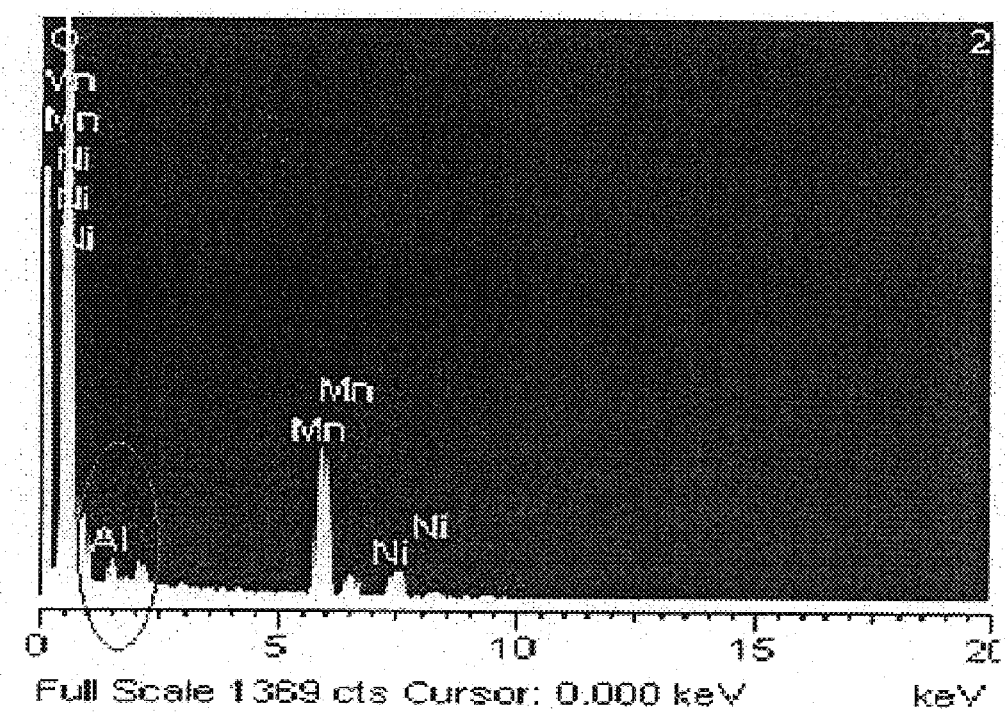
Figure 2C:
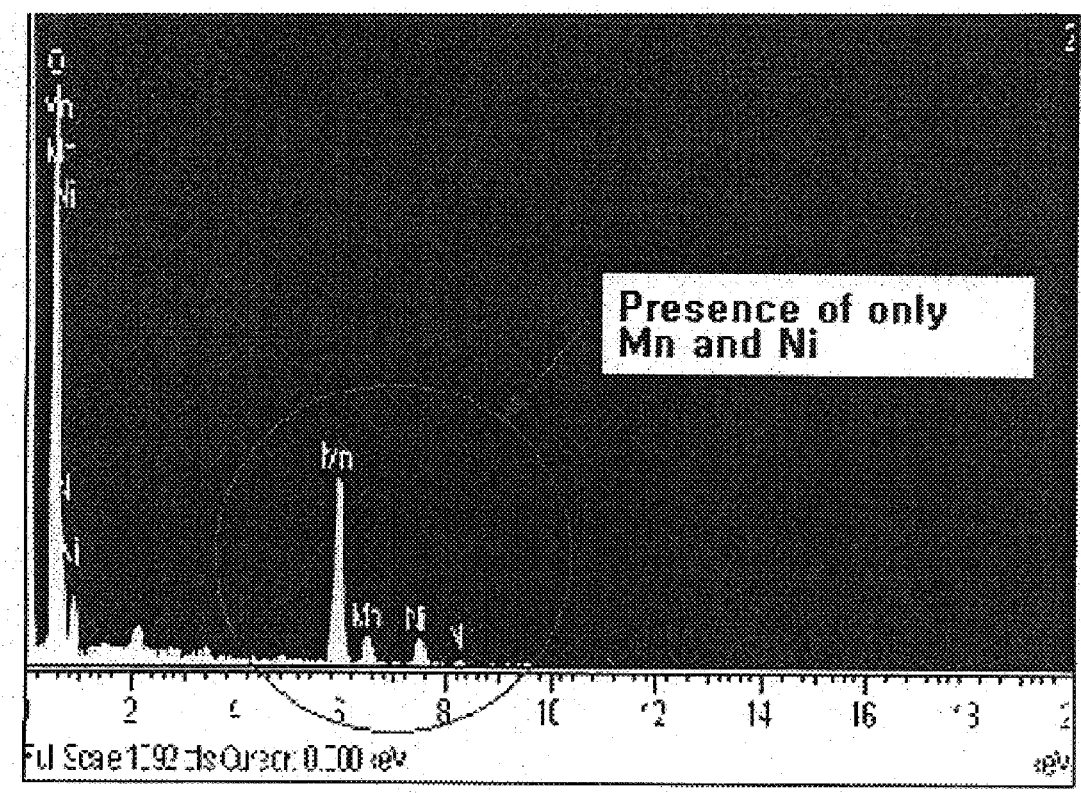
FIG. 2c shows EDX analysis of positive active materials according to Comparative Example 1.

To confirm the composition of the positive electrode, EDX analysis was carried out on the positive electrode according to Example 3 and Comparative Example 1, and the results are shown in FIGS. 2a, 2b, and 2c. FIGS. 2a and 2b show results of the EDX analysis of the positive electrode according to Example 3. As shown in FIGS. 2a and 2b, in the positive electrode of Example 3, the presence of Mn, Ni, and Al are shown, while, according to FIG. 2c, the presence of only Mn and Ni are shown in the positive electrode of Comparative Example 1.

Figure 3:
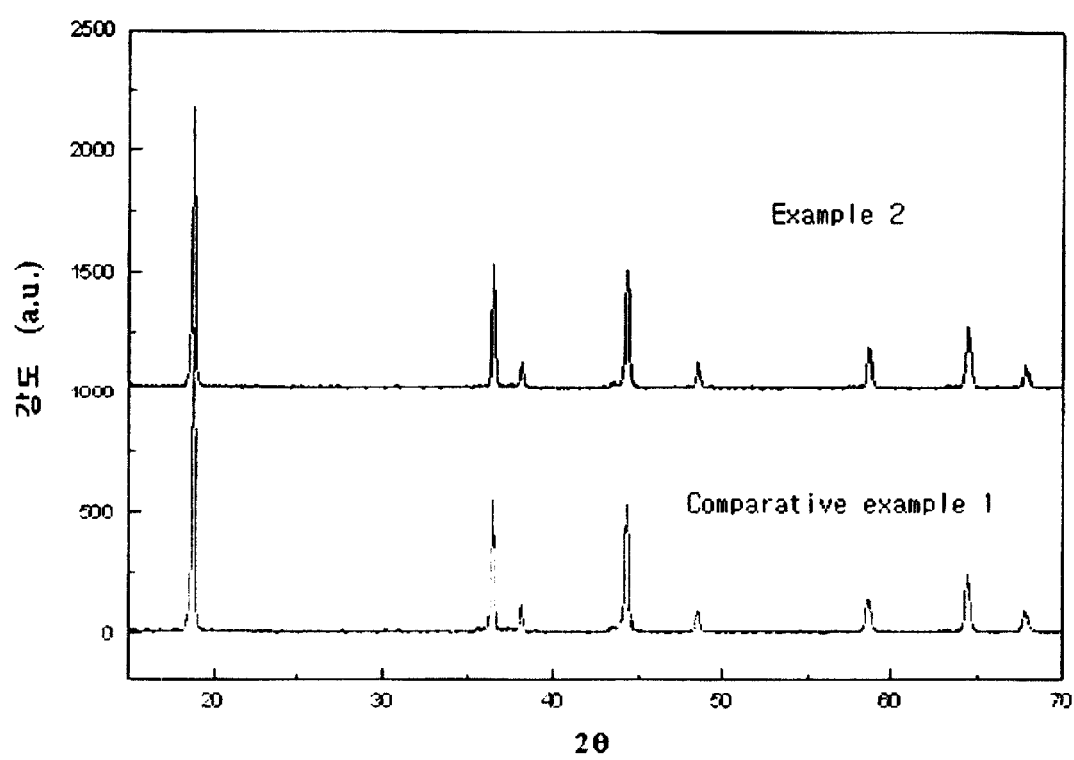
FIG. 3 shows X-ray diffraction ("XRD", hereinafter) patterns of positive active materials according to Example 2 of the present invention and Comparative Example 1.

FIG. 3 shows XRD patterns of positive active materials according to Example 2 and Comparative Example 1. As shown in FIG. 3, since the XRO pattern of Example 2 is similar to that of Comparative Example 1, the crystal graphic structure of $LiMn_{1.5}Ni_{0.5}Al_{0.03}O_4$ of Example 2 is similar to that of $LiMn_{1.5}Ni_{0.5}Al_{0.5}O_4$ of Comparative Example 1.

<Charge and Discharge Characteristics of Manganese Based Positive Active Material>

Figure 4:
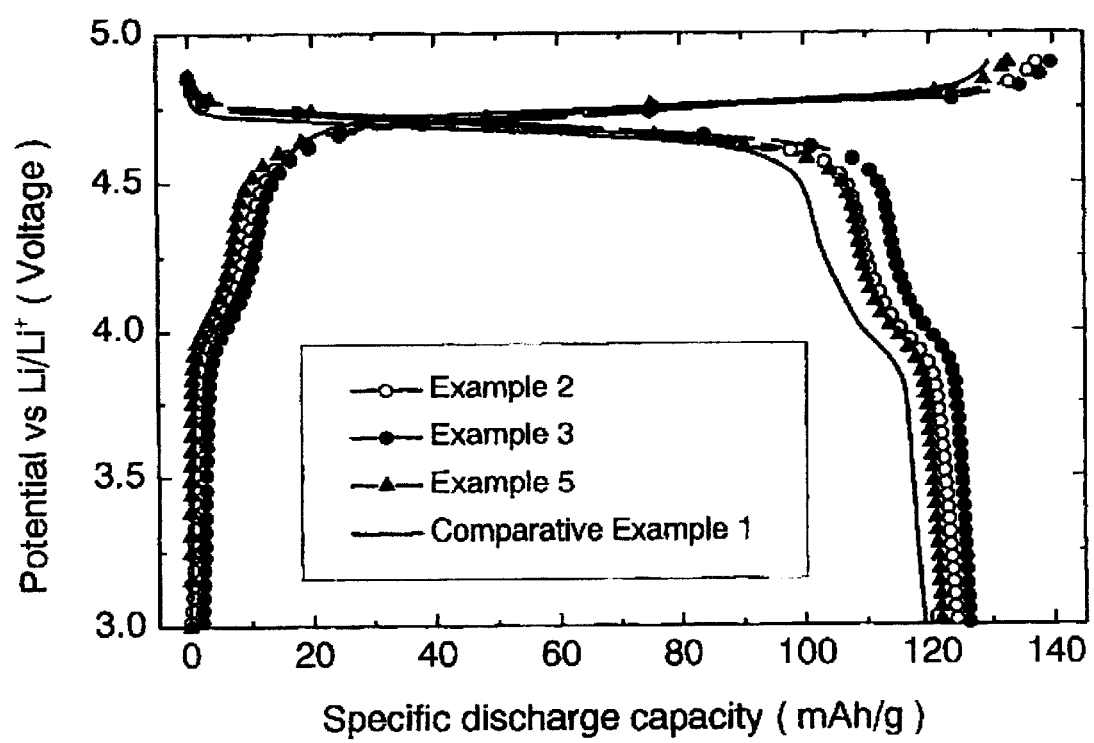
FIG. 4 shows a graph illustrating charge and discharge characteristics at a rate of 0.1 C for coin cells using positive active materials according to Examples 2, 3, and 5 of the present invention and Comparative Example 1.

To see the effect of using an Al-doping suspension on the charge and discharge characteristics of a positive active material, coin cells fabricated using positive active materials according to Examples 2, 3, and 5 and Comparative Example 1 were charged and discharged at a rate of 0.1 C and the initial charge and discharge voltages and the discharging capacity thereof were measured. The results are shown in FIG. 4. As shown in FIG. 4, the coin cells using positive active materials of Examples 2, 3, and 5 have higher initial discharge capacity than that of Comparative Example 1.

Figure 5:
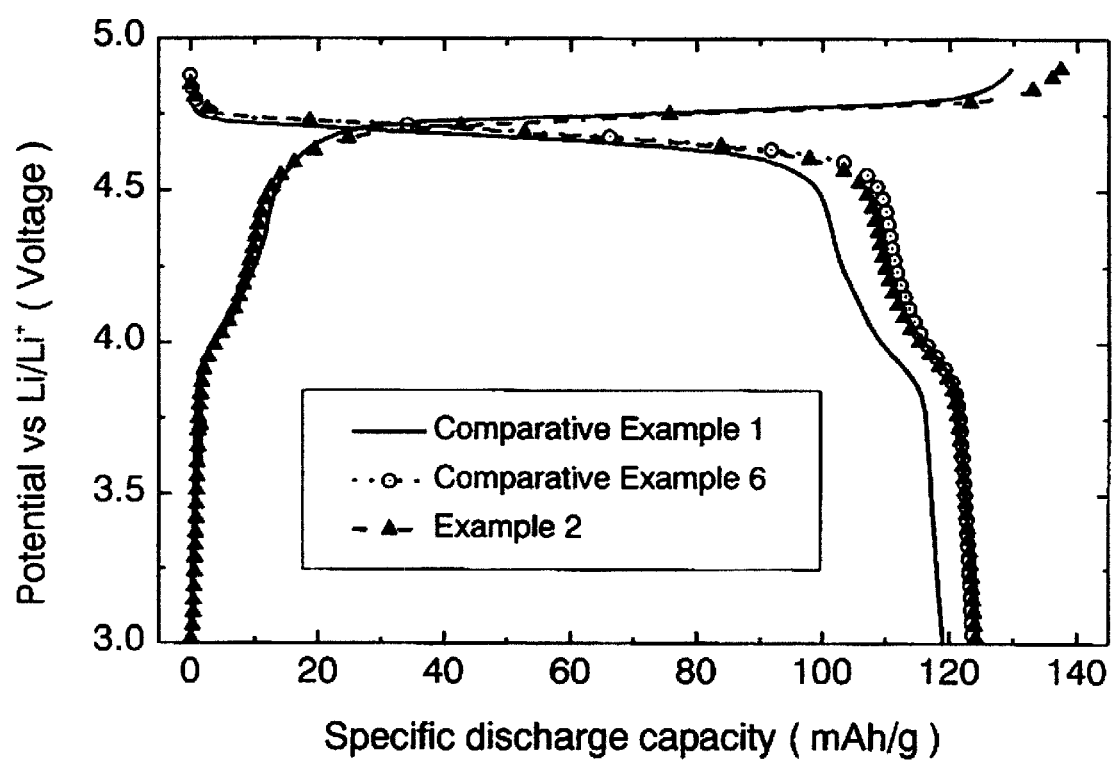
FIG. 5 shows a graph illustrating charge and discharge characteristics at a rate of 0.1 C for coin cells using positive active materials according to Example 2 of the present invention and Comparative Examples 1 and 6.

To see the effects of using the Al-doping suspension, instead of using the solid $Al_2O_3$ powder, on the charge and discharge characteristics of the active material, coin cells fabricated using positive active materials according to Example 2 and Comparative Examples 1 and 6 were charged and discharged at a rate of 0.1C, then the initial charge and discharge voltages and the discharging capacities thereof were measured. The results are shown in FIG. 5. As shown in FIG. 5, the coin cells using Al-doped positive active materials of Example 2 and Comparative Example 6 have higher initial discharge capacities than that of Comparative Example 1, which is not Al-doped.

Figure 6:
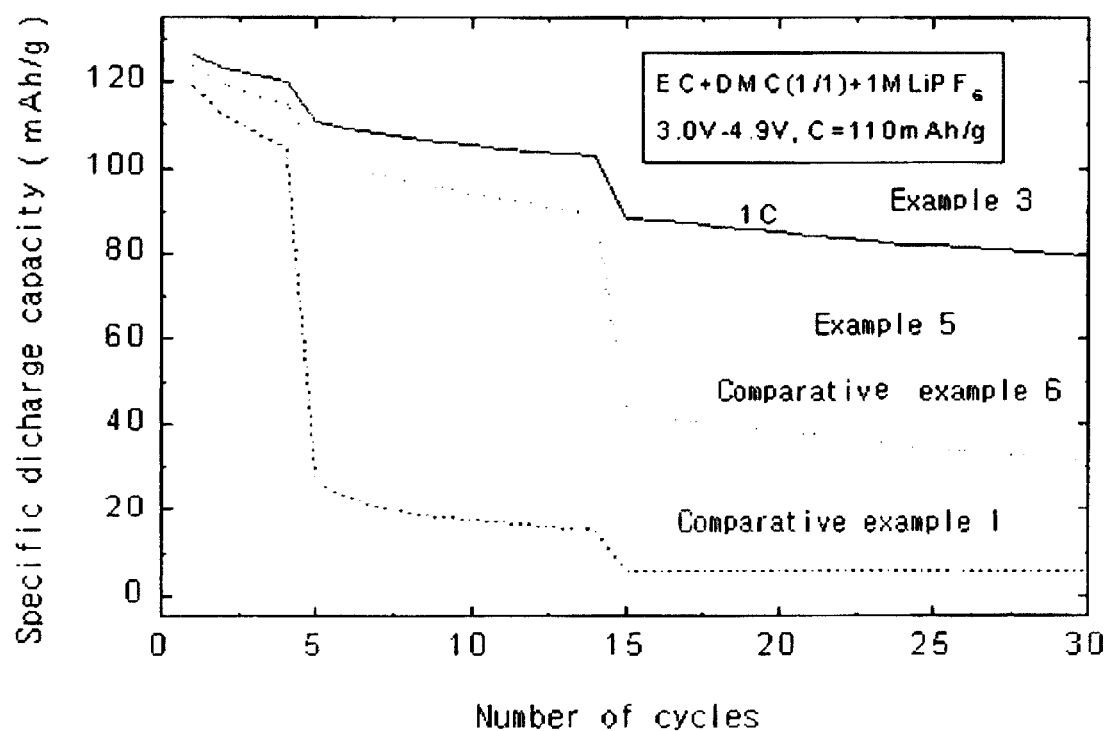
FIG. 6 shows a graph illustrating cycle-life characteristics of coin cells using positive active materials according to Examples 3 and 5 of the present invention and Comparative Examples 1 and 6.

To see the effects of using the Al-doping suspension, instead of using the solid $Al_2O_3$ powder, on the cycling performance of the active material, coin cells were fabricated using positive active materials according to Examples 3 and 5 and Comparative Examples 1 and 6. The results on cycle-life characteristics are shown in FIG. 6. As shown in FIG. 6, the coin cells using positive active materials of Examples 3, and 5 have superior cycle-life characteristics compared to those of Comparative Examples 1 and 6.

COMPARATIVE EXAMPLE 8

A $LiCoO_2$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut in a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

COMPARATIVE EXAMPLE 9

$Co_3O_4$ and LiOH were weighed in an equivalent ratio of Li/Co=1/1 and the mixture was ground in an ethanol grinding media in an agate mortar until the excess ethanol was evaporated.

The resultant mixture was first heat-treated at 450° C. for 10 hours under flowing air. The first-heat-treated powder was cooled at room temperature and ground in the agate mortar to prepare a uniform mixture of LiOH and $Co_3O_4$. Subsequently, the powder was subjected to the second heat-treatment at 700° C. for 5 hours under flowing air. The resultant material was sieved through a 325-mesh sieve to obtain a $LiCoO_2$ positive active material powder.

The $LiCoO_2$ positive active material powder, a carbon conductive agent, and polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

COMPARATIVE EXAMPLE 10

LiOH, $Co_3O_4$, and $Al_2O_3$ were weighed in an equivalent ratio of Li/Co/Al=1/0.97/0.03 and mixed in an ethanol grinding media in an agate mortar until the excess ethanol was evaporated.

The resultant mixture was first heat-treated at 450° C. for 10 hours under flowing air. The first-heat-treated powder was cooled at room temperature and ground in an agate mortar to prepare a uniform mixture of LiOH, $Co_3O_4$ and $Al_2O_3$. Subsequently, the powder was subjected to the second heat-treatment at 700° C. for 5 hours under flowing air. The resultant material was sieved through a 325-mesh sieve to obtain a $LiCo_{0.97}Al_{0.03}O_2$ positive active material powder.

The $LiCo_{0.97}Al_{0.03}O_2$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut into a disk having a 1.6 cm diameter to prepare a positive electrode for a coin cell.

A coin-type half-cell was fabricated in a glove box using the positive electrode and a lithium counter electrode.

EXAMPLE 9

$Co_3O_4$, LiOH, and ethanol suspension of 5% Al-isopropoxide were weighed in an equivalent ratio of Li/Co/Al=1/0.97/0.03, and mixed in an agate mortar until the excess ethanol was evaporated.

The resultant mixture was first heat-treated at 450° C. for 10 hours under flowing air. The first-heat-treated powder was cooled at room temperature and ground in an agate mortar to prepare a uniform mixture. Subsequently, the powder was subjected to the second heat-treatment at 700° C. for 5 hours under flowing air. The resultant material was sieved through a 325-mesh sieve to obtain a $LiCo_{0.97}Al_{0.03}O_2$ positive active material powder.

The $LiCo_{0.97}Al_{0.03}O_2$ positive active material powder, a carbon conductive agent, and a polyvinylidene fluoride binder were weighed in the weight ratio of 94:3:3 and then mixed in an N-methyl pyrrolidone solvent to prepare a positive active material slurry. The slurry was cast (coated) in a coating thickness of 100 μm on a 25 μm thick Al foil, and the cast foil was cut into a disk having a 1.6 cm diameter to prepare a positive electrode for a coin cell.

A coin-type half-cell was fabricated in a glove box using the positive electrode and a lithium counter electrode. As an electrolyte, 1 M $LiPF_6$ solution of ethylene carbonate and dimethyl carbonate in a 1:1 volume ratio was used.

EXAMPLE 10

A coin-type half-cell was fabricated by the same procedure as in Example 9, except that 1% Al-isopropoxide suspension was used.

EXAMPLE 11

A coin-type half-cell was fabricated by the same procedure as in Example 9, except that 10% Al-isopropoxide suspension was used.

<Morphology Characteristics of Cobalt Based Positive Active Material>

Figure 7A:
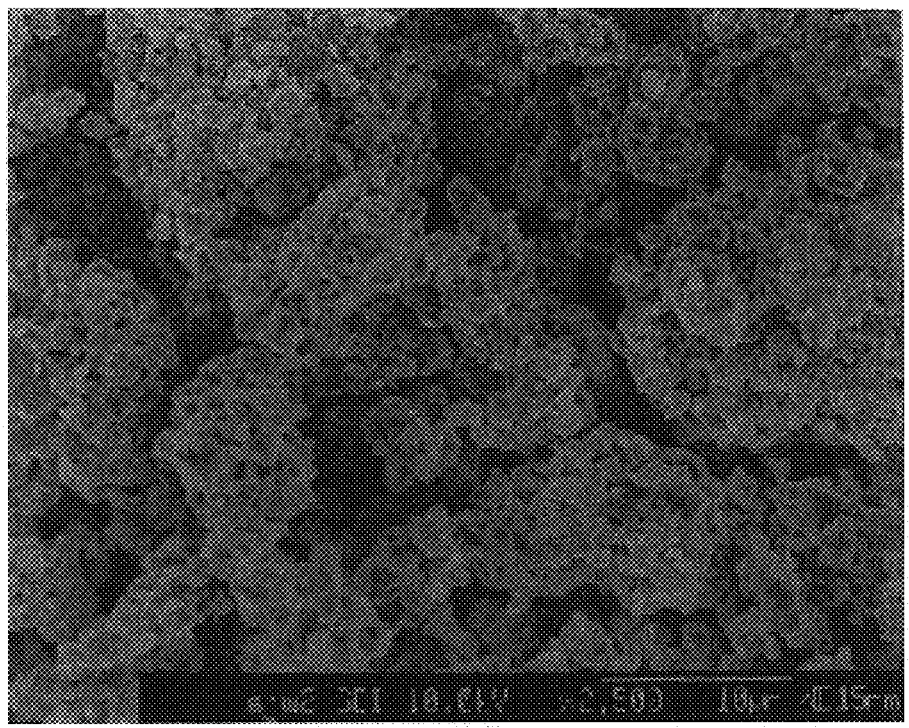
FIG. 7a shows an SEM photograph of a positive active material according to Example 9 of the present invention.
Figure 7B:
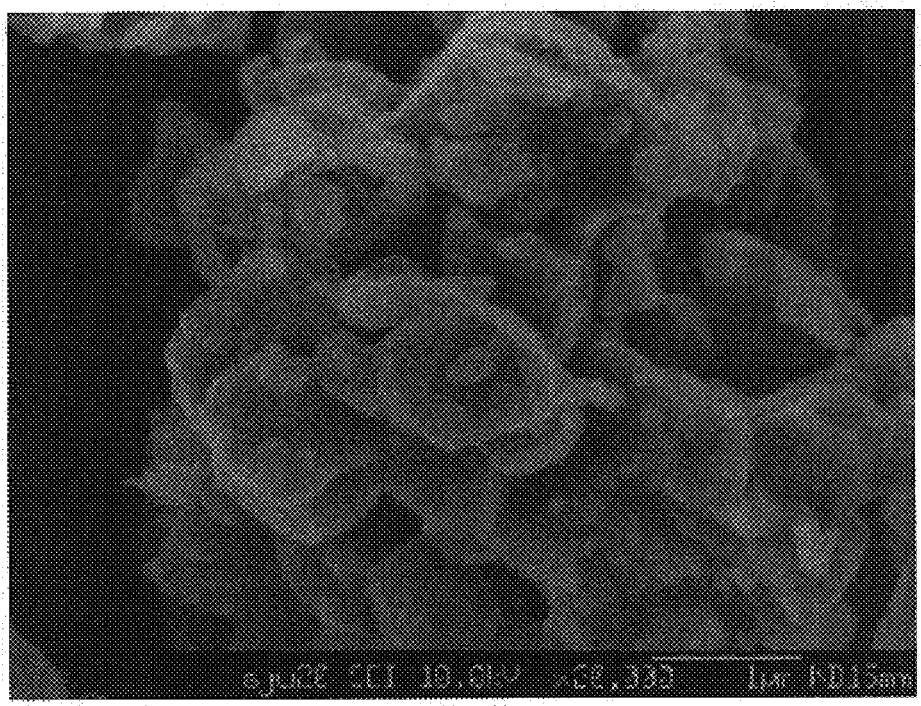
Figure 8A:
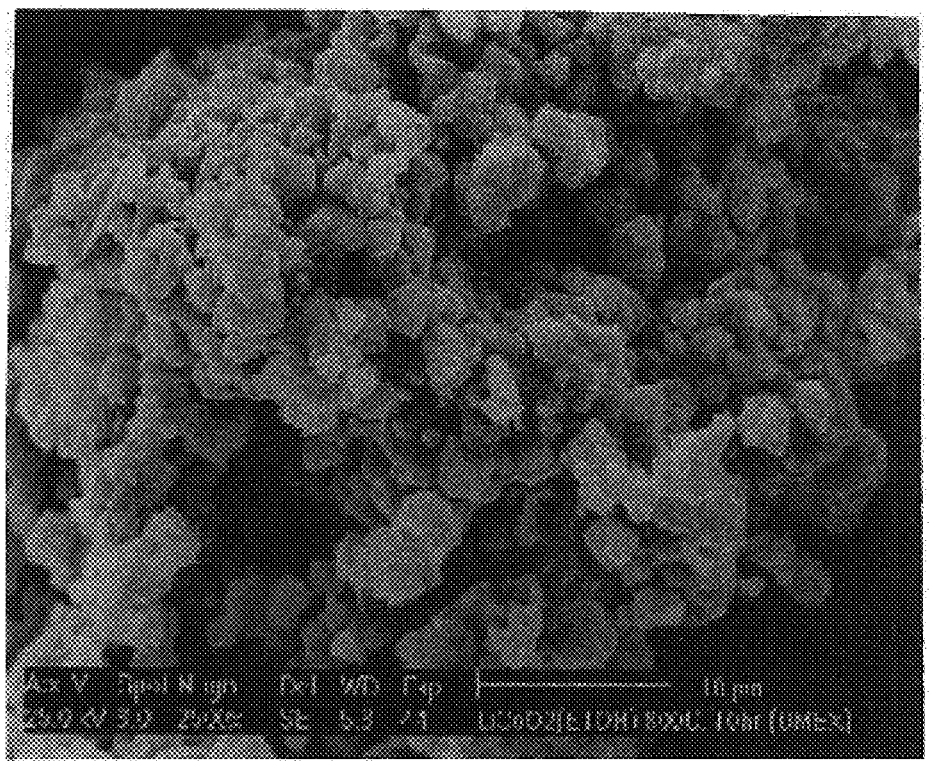
FIG. 8a shows an SEM photograph of a positive active material according to Comparative Example 8.
Figure 8B:
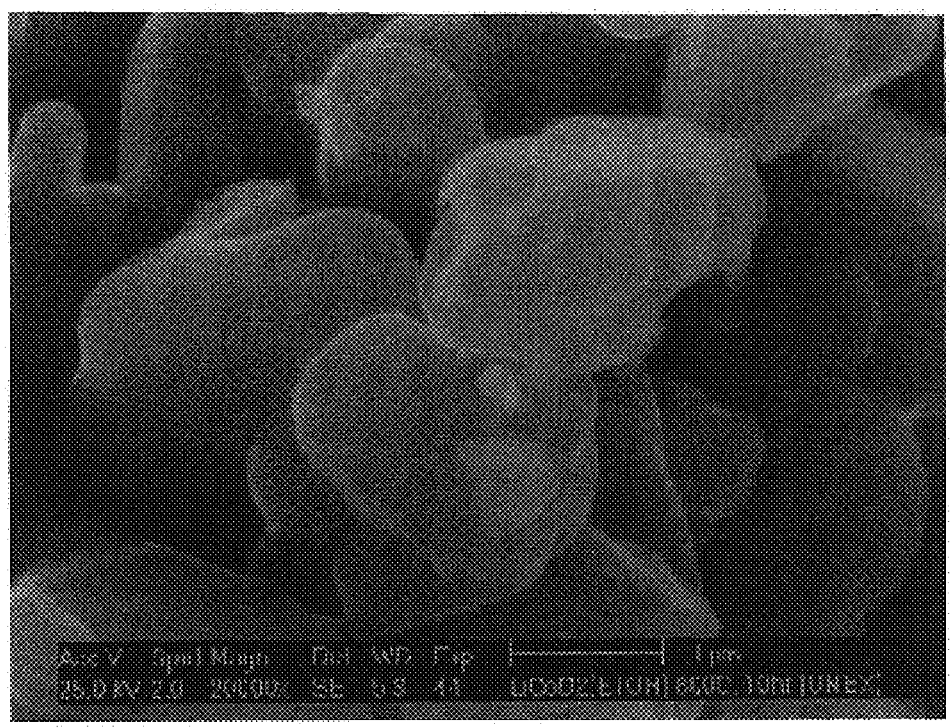
Figure 9A:
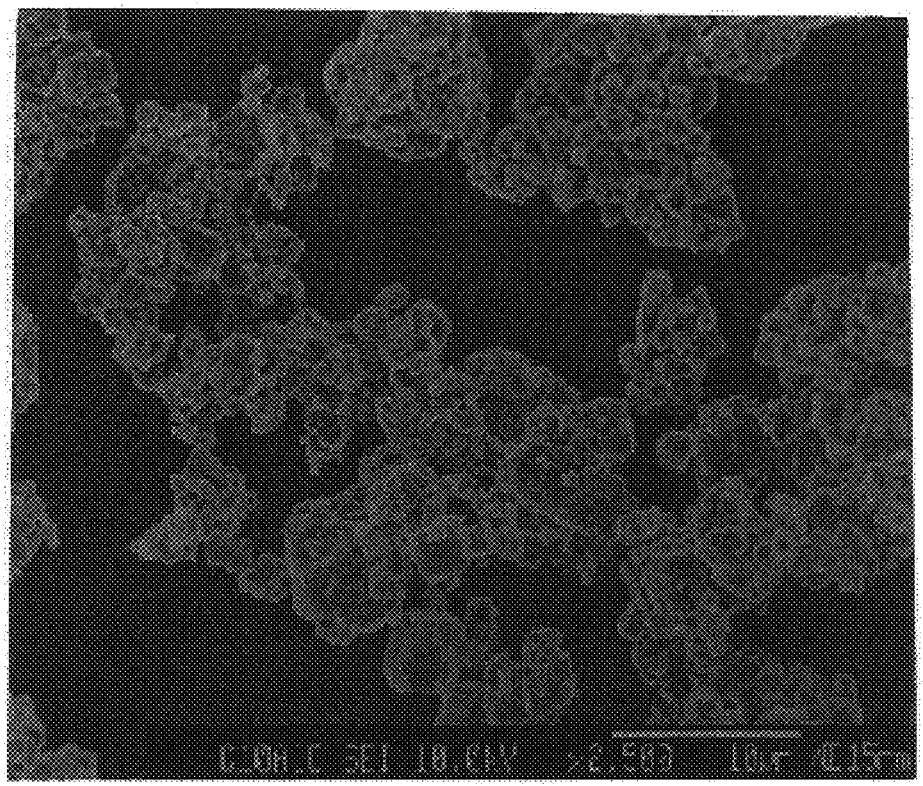
FIG. 9a shows an SEM photograph of a positive active material according to Comparative Example 10.
Figure 9B:
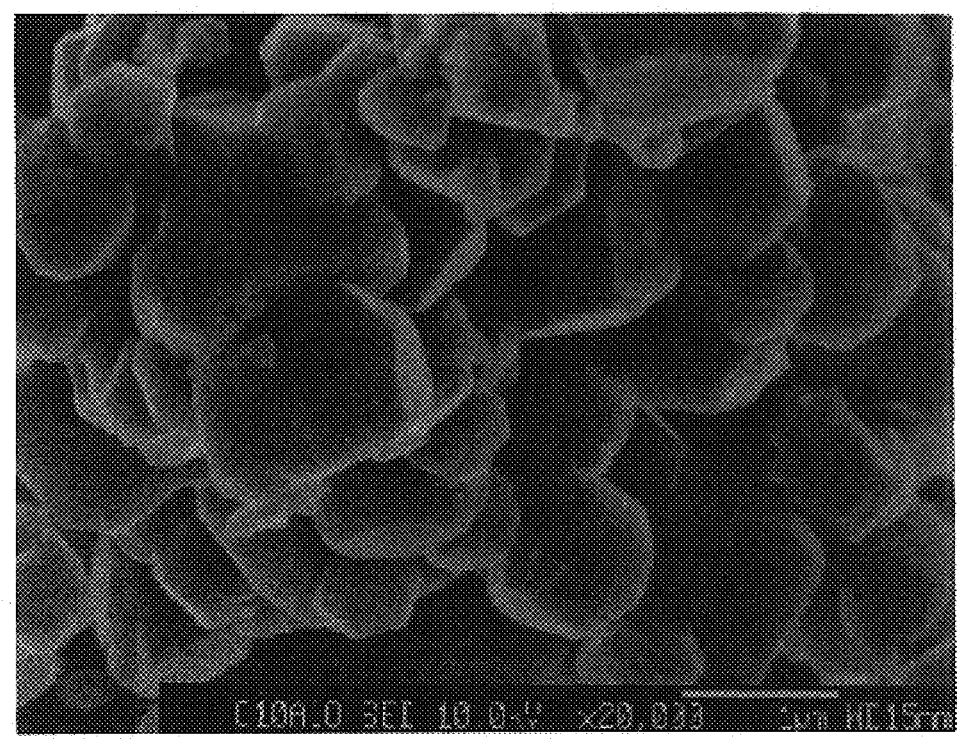

FIGS. 7a, 8a, and 9a show SEM photographs of positive active materials according to Example 9 and Comparative Examples 8 and 10, respectively, and FIGS. 7b, 8b, and 9b show eight-times enlarged SEM photographs thereof. As shown in FIGS. 7a and 7b, the positive active material of Example 9 is made of aggregates of small particles of various sizes, whereas the positive active material of Comparative Examples 8 and 9 are made of aggregates of relatively large particles.

Figure 10:
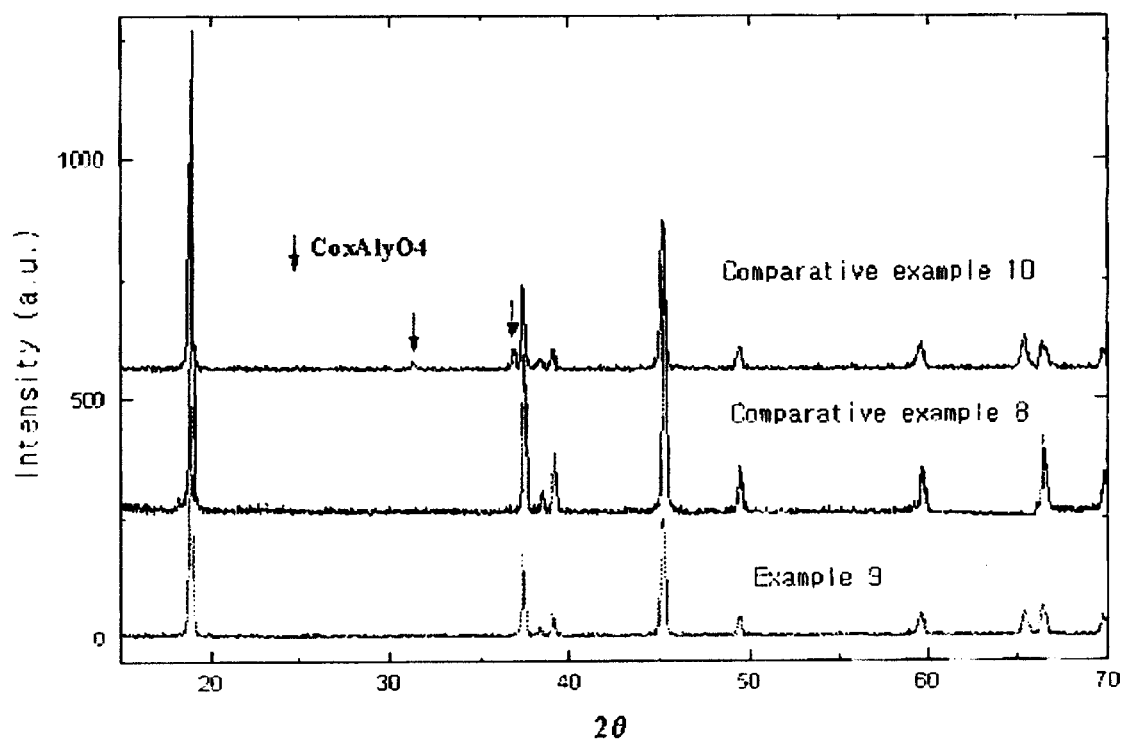
FIG. 10 shows a graph illustrating XRD patterns of positive active materials according to Example 9 of the present invention, and Comparative Examples 8 and 10.

FIG. 10 shows XRD patterns of positive active materials according to Example 9 and Comparative Examples 8 and 10. As shown in FIG. 10, the XRD pattern of Example 9 is similar to that of Comparative Example 8, while that of Comparative Example 10 has a peak for $Co_xAlO_4$. Considering these patterns, when an Al-doping process is carried out with an Al-doping liquid, the structure of $LiCoO_2$ is maintained, whereas when the Al-doping process is carried out with an Al-doping powder, the structure of $LiCoO_2$ is deformed.

<Charge and Discharge Characteristics of Cobalt Based Positive Active Material>

Figure 11:
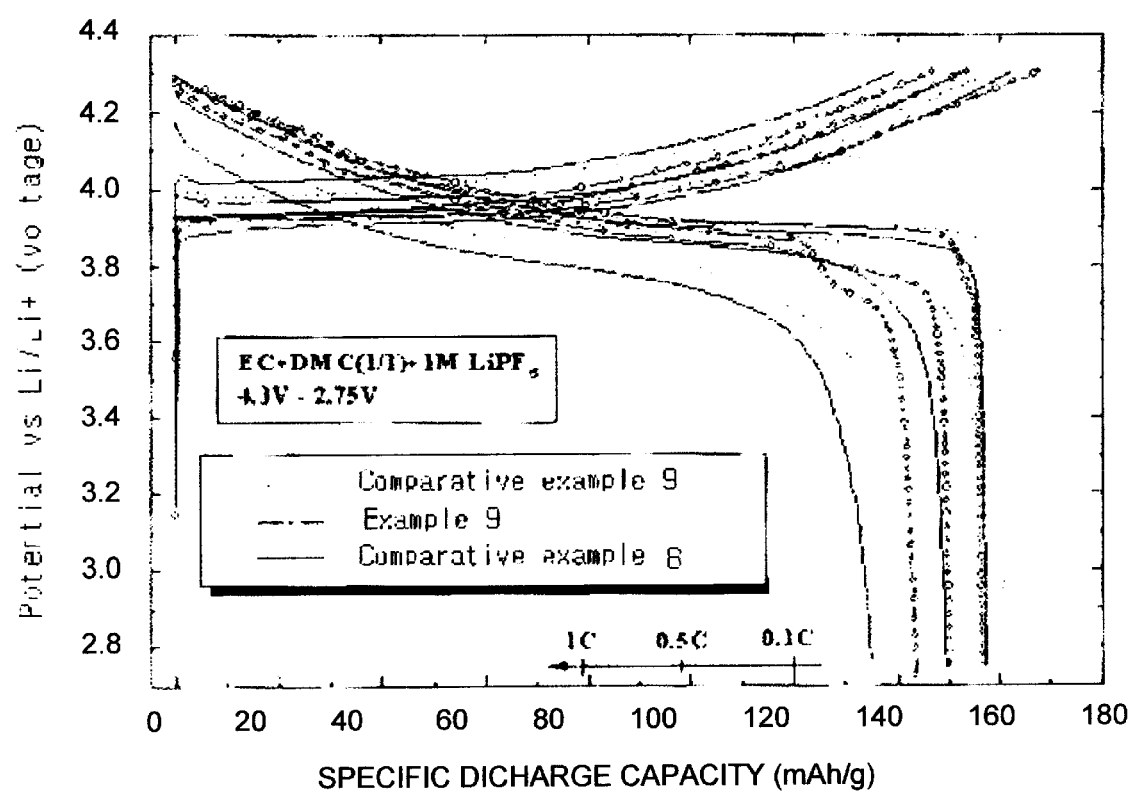
FIG. 11 shows a graph illustrating charge and discharge characteristics of coin cells according to Example 9 of the present invention and Comparative Example 8 and 9.

Positive active materials according to Example 9 and Comparative Examples 8 and 9 are charged and discharged at various C-rates, then the charge and discharge voltage and the discharge capacity thereof are measured, and the results are shown in FIG. 11. As shown in FIG. 11, in the positive active material of Example 9. the charge and discharge voltages and the capacities change much less as the rates are increased from 0.1C to 1C rate than the positive active materials of Comparative Examples 8 and 9, which show much larger changes in the voltages as well as the capacity as the C-rate is changed. Tables 1 and 2 show detailed data of the discharge capacity and the discharge voltage values at various C-rates, respectively.

TABLE 1

Unit: mAh/g

|  | 0.1 C | 0.5 C | 1 C |
|---|---|---|---|
| Comparative Example 8 | 158 | 150 | 135 |
| Comparative Example 9 | 161 | 157 | 144 |
| Example 9 | 158 | 151 | 144 |

TABLE 2

Unit: Voltage (V)

|  | 0.1 C | 0.5 C | 1 C |
|---|---|---|---|
| Comparative Example 8 | 3.92 | 3.88 | 3.81 |
| Comparative Example 9 | 3.93 | 3.90 | 3.85 |
| Example 9 | 3.94 | 3.93 | 3.91 |

Figure 12:
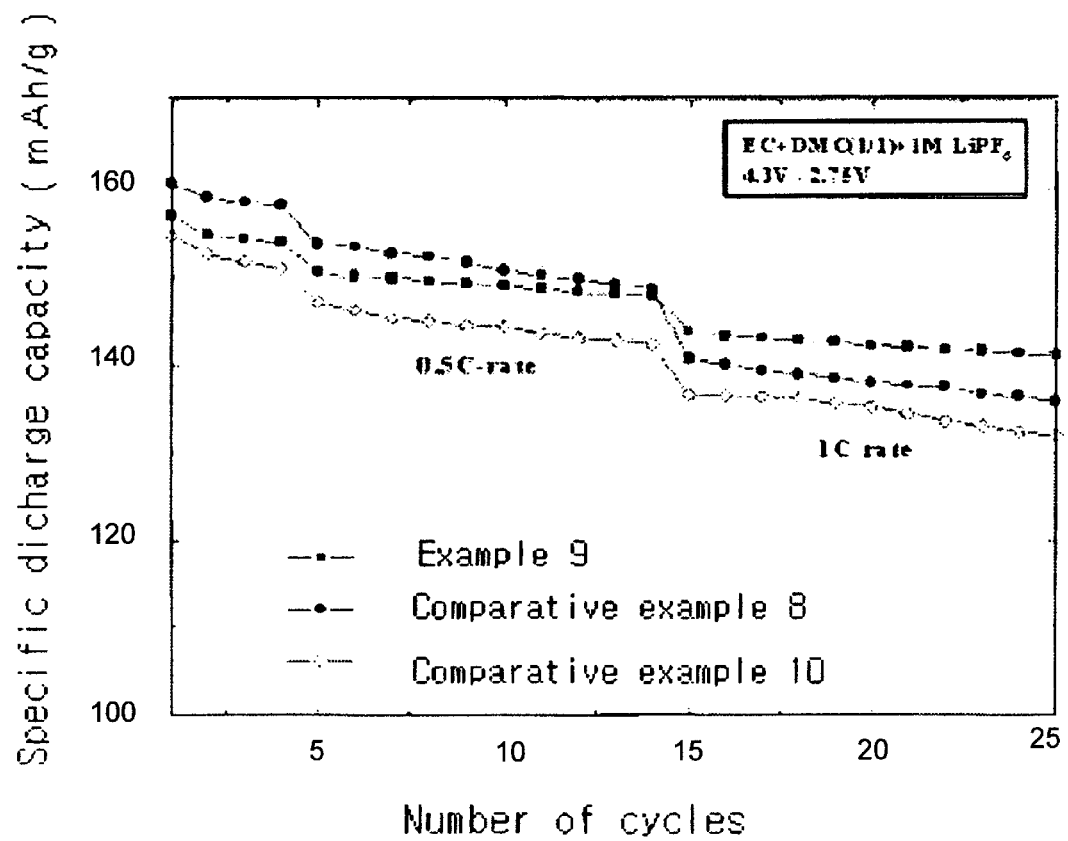
FIG. 12 shows a graph illustrating cycle-life characteristics of coin cells according to Example 9 of the present invention and Comparative Examples 8 and 10.

FIG. 12 shows cycle-life characteristics of Example 9 and Comparative Examples 8 and 10. As shown in FIG. 12, the positive active material of Example 9 has superior cycle-life characteristics compared with those of Comparative Examples 8 and 10.

The present invention provides a positive active material having improved high-rate charge and discharge characteristics including capacity and cycle-life characteristics by adding a doping element in a form of liquid.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing a positive active material for a rechargeable lithium battery comprising:
    mixing a lithium source, a metal source, and a doping liquid comprising a doping element to form a mixture; and
    heat-treating the mixture, the heat-treating comprising:
        a first heat-treating at a temperature ranging from 400° C. to 500° C.; and
        a second heat-treatment at a temperature ranging from 700° C. to 900° C.

2. The method according to claim 1, wherein the doping element is selected from the group consisting of Mg, Al, Co, K, Na, Ca, Si, Ti, Sn, V, Ge, Ga, B, As, Zr, Ni, Mn, Cr, Sr, rare earth metals, and mixtures thereof.

3. The method according to claim 1, wherein the doping liquid comprises a volatile solvent or water.

4. The method according to claim 1, wherein the doping liquid comprises alcohol.

5. The method according to claim 1, wherein the metal source is at least one compound selected from the group consisting of manganese sources, nickel sources, and cobalt sources.

6. The method according to claim 1, wherein the positive active material is selected from the group consisting of compounds represented by the formulas 1 to 13:

$$Li_xMn_{1-y}M_yA_2 \tag{1}$$

$$Li_xMn_{1-y}M_yO_{2-z}X_z \tag{2}$$

$$Li_xMn_2O_{4-z}X_z \tag{3}$$

$$Li_xMn_{2-y}M_yA_4 \tag{4}$$

$$Li_xCo_{1-y}M_yA_2 \tag{5}$$

$$Li_xCo_{1-y}M_yO_{2-z}X_z \tag{6}$$

$$Li_xNi_{1-y}M_yA_2 \tag{7}$$

$$Li_xNi_{1-y}M_yO_{2-z}X_z \tag{8}$$

$$Li_xNi_{1-y}Co_yO_{2-z}X_z \tag{9}$$

$$Li_xNi_{1-y-z}Co_yM_zA_\alpha \tag{10}$$

$$Li_xNi_{1-y-z}Co_yM_zO_{2-\alpha}X_\alpha \tag{11}$$

$$Li_xNi_{1-y-z}Mn_yM_zA_\alpha \tag{12}$$

$$Li_xNi_{1-y-z}Mn_yM_zO_{2-\alpha}X_\alpha \tag{13}$$

wherein
    $0.95 \leq x \leq 1.1$, $0 \leq y \leq 0.5$, $0 \leq z \leq 0.5$, $0 < \alpha \leq 2$;
    M is selected from the group consisting of Mg, Al, Co, K, Na, Ca, Si, Ti, Sn, V, Ge, Ga, B, As, Zr, Ni, Mn, Cr, Sr, and rare earth metals, and mixtures thereof;
    A is selected from the group consisting of O, F, S, and P; and
    X is selected from the group consisting of F, S, and P.

7. The method according to claim 1, wherein the first heat treatment is maintained for 5 hours to 20 hours; and the second heat treatment is maintained for 10 hours to 30 hours.

8. A method for preparing a positive active material for a rechargeable lithium battery comprising:
    mixing a lithium source; at least one metal source including at least one of a cobalt source, a manganese source, and a nickel source; and a doping liquid comprising a doping element selected from the group consisting of Mg, Al, Co, K, Na, Ca, Si, Ti, Sn, V, Ge, Ga, B, As, Zr, Ni, Mn, Cr, Sr, rare earth metals, and mixtures thereof to form a mixture; and
    heat-treating the mixture, the heat-treating comprising:
        a first heat treatment at a temperature ranging from 400° C. to 500° C.; and
        a second heat treatment at a temperature ranging from 700° C. to 900° C.

9. The method according to claim 8, wherein the doping liquid comprises a volatile solvent or water.

10. The method according to claim 8, wherein the doping liquid comprises alcohol.

11. The method according to claim 8, wherein the positive active material is selected from the group consisting of compounds represented by the formulas 1 to 13:

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yA_4 \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein $0.95 \leq x \leq 1.1$, $0 \leq y \leq 0.5$, $0 \leq z \leq 0.5$, $0 < \alpha \leq 2$;

M is selected from the group consisting of Mg, Al, Co, K, Na, Ca, Si, Ti, Sn, V, Ge, Ga, B, As, Zr, Ni, Mn, Cr, Sr, and rare earth metals, and mixtures thereof;

A is selected from the group consisting of O, F, S, and P; and

X is selected from the group consisting of F, S, and P.

12. The method according to claim 8, wherein the first heat treatment is maintained for 5 hours to 20 hours; and the second heat treatment is maintained for 10 hours to 30 hours.

13. A method for preparing a positive active material for a rechargeable lithium battery comprising:

mixing a lithium source, at least one metal source including at least one of a cobalt source, a manganese source, and a nickel source; and an Al-including doping liquid or a B-including doping liquid to form a mixture; and heat-treating the mixture, the heat-treating comprising:
a first heat treatment at a temperature ranging from 400° C. to 500° C.; and
a second heat treatment at a temperature ranging from 700° C. to 900° C.

14. The method according to claim 13, wherein the doping liquid comprises a volatile solvent or water.

15. The method according to claim 13, wherein the doping liquid comprises alcohol.

16. The method according to claim 13, wherein the positive active material is selected from the group consisting of compounds represented by the formulas 1 to 13:

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yA_4 \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein $0.95 \leq x \leq 1.1$, $0 \leq y \leq 0.5$, $0 \leq z \leq 0.5$, $0 < \alpha \leq 2$;

M is selected from the group consisting of Mg, Al, Co, K, Na, Ca, Si, Ti, Sn, V, Ge, Ga, B, As, Zr, Ni, Mn, Cr, Sr, and rare earth metals, and mixtures thereof;

A is selected from the group consisting of O, F, S, and P; and

X is selected from the group consisting of F, S, and P.

17. The method according to claim 13, wherein the first heat treatment is maintained for 5 hours to 20 hours; and the second heat treatment is maintained for 10 hours to 30 hours.

18. The method according to claim 13, wherein the metal source is a cobalt source, and the doping liquid is an Al-including doping liquid.

19. The method according to claim 13, wherein the metal source is a manganese source or a nickel source, and the doping liquid is an Al-including doping liquid.

20. The method according to claim 13, wherein the metal source is a manganese source or a nickel source, and the doping liquid is a B-including doping liquid.

* * * * *